United States Patent
Newton

[11] 3,881,509
[45] May 6, 1975

[54] MECHANISM FOR MAINTAINING THE LEVEL OF A VISCOUS LIQUID

[75] Inventor: Albert E. Newton, Beverly, Mass.

[73] Assignee: USM Corporation, Boston, Mass.

[22] Filed: Apr. 19, 1973

[21] Appl. No.: 352,714

[52] U.S. Cl.................................... 137/386; 118/7
[51] Int. Cl............................................ B05c 11/10
[58] Field of Search........... 118/7; 137/386; 73/293; 356/256; 250/573, 576, 577

[56] References Cited
UNITED STATES PATENTS
2,415,644   2/1947   Leonhard et al. .............. 137/386 X
2,621,808   12/1952  Blakeney....................... 137/386 X Primary Examiner—John P. McIntosh
Attorney, Agent, or Firm—Carl E. Johnson; Vincent A. White; Richard B. Megley

[57] ABSTRACT

An automatic liquid level maintenance mechanism employs a probe or plunger for periodically withdrawing a small amount of viscous fluid from the exposed surface of a supply in a container. The fluid thus raised as a "curtain" is allowed freely to fall from the retracted plunger and return to the supply. The liquid curtain is disposed to intercept a light beam which, in the absence of an adequate curtain due to low level of the liquid, is received by a sensor adapted to signal for liquid replenishment.

9 Claims, 7 Drawing Figures

MECHANISM FOR MAINTAINING THE LEVEL OF A VISCOUS LIQUID

BACKGROUND OF THE INVENTION

This invention relates to a technique and automatic mechanism for controlling the level of liquids, notably viscous fluid, in a container. More particularly, the invention is concerned with providing a simple and reliable means for continuously insuring that, when the level of a liquid in a reservoir goes below an acceptable range, the supply of liquid will be promptly and automatically replenished; likewise, should the level begin to exceed the acceptable range, the same means will, without fail, reduce or terminate the inflow promptly.

The problem of monitoring a liquid supply arises in different ways and in many types of machinery and equipment. There have also been numerous different approaches to providing solutions, and with varying degrees of success. Although the present invention is not restricted to use in regulating any particular type of viscous fluid, an exemplary application for which the invention is especially well suited is the control of liquid hot melt adhesive in an applicator reservoir. Prior endeavers to provide liquid level sensing in this area have included the following, for instance, with attendant difficulties as indicated:

1. A heat probe detected the 400°F. on contact with the liquid during level rising: calibration changes due to charring and cement buildup were major problems encountered.

2. Liquid level floats unreliable due to congealing of the adhesive and resultant change in their buoyancy.

3. Attempts to match the in-feeding of cement with the volume used over a period of time have been unsuccessful.

4. Fluidic level sensing devices have been employed but air flow reshapes the surface of the adhesive and fails to indicate liquid level reliably.

5. An adjustably set timing device provided to enable an operator to equate adhesive supply rate with his application or usage rate is found moderately successful if the operator remains alert and visually views the reservoir level from time to time.

In the case of adhesives and with many other liquids, when the level control goes awry the clean-up problems and incidental costs are considerable. The present invention takes advantage of the viscosity of the liquid to be controlled to solve the problem in a unique, accurate, and uncomplicated manner.

SUMMARY OF THE INVENTION

In view of the foregoing, it is a main object of this invention to provide a reliable technique and automatic mechanism for controlling the level of a supply of viscous liquid.

Another object of the invention is to provide an improved means for continuously monitoring the supply of liquid available in a reservoir, the viscosity of the liquid being utilized for this purpose.

A further and more specific object of this invention is to provide a coating machine with continuously operative surveillance mechanism for insuring that its coating material is in adequate supply and any undue deviation therefrom will be promptly corrected.

To these ends the invention contemplates a novel liquid level maintenance control mechanism which is responsive to the viscous behavior of the liquid in resisting flow. As herein illustrated, a surface probe in the form of a plunger reciprocable heightwise is employed to periodically lift a small "curtain" of the liquid. The arrangement is such that when the surface of the liquid is within an acceptable range, the curtain lifted is adequate to block a light beam directed to a sensor which may desirably be in the form of a phototransistor. In such condition, and also while the plunger is partly immersed in the liquid, the beam is interrupted and no signal is generated to a control circuit to modify liquid replenishment; but when the ascending plunger, because of a lowering of the liquid surface below an acceptable level, can not raise a liquid curtain between the surface and the plunger adequate to block the field of view of the sensor, the beam is converted to a signal pulse which is amplified through a relay and associated control circuitry to energize replenishment or input feed mechanism. It will be understood that the latter may be in any of different conventional forms, such as a motor-pump unit for supplying liquid or a motor and feed wheels for advancing a solid such as a rod type adhesive.

The invention when applied to a machine for applying stiffening material to the uppers of shoes, for instance a machine of the general type disclosed in U.S. Letters Pat. No. 3,277,867 issued Oct. 11, 1966, has been found capable of holding a hot melt surface level within plus or minus 1/16 inch approximately; changes in adhesive viscosity due to temperature differentials are tolerable; and bubbles and extraneous light seem to have no adverse effect. It will be understood that various modifications and adaptations of the invention enabling level control in other coating machines, liquid handling equipment, etc., of widely different types may be advantageously practiced without departing from the scope of this invention.

BRIEF DESCRIPTION OF THE DRAWINGS

The foregoing and other features of the invention will now be more particularly described in connection with an illustrative embodiment, and with reference to the accompanying drawings thereof, in which.

DESCRIPTION OF PREFERRED EMBODIMENT

Figure 1:
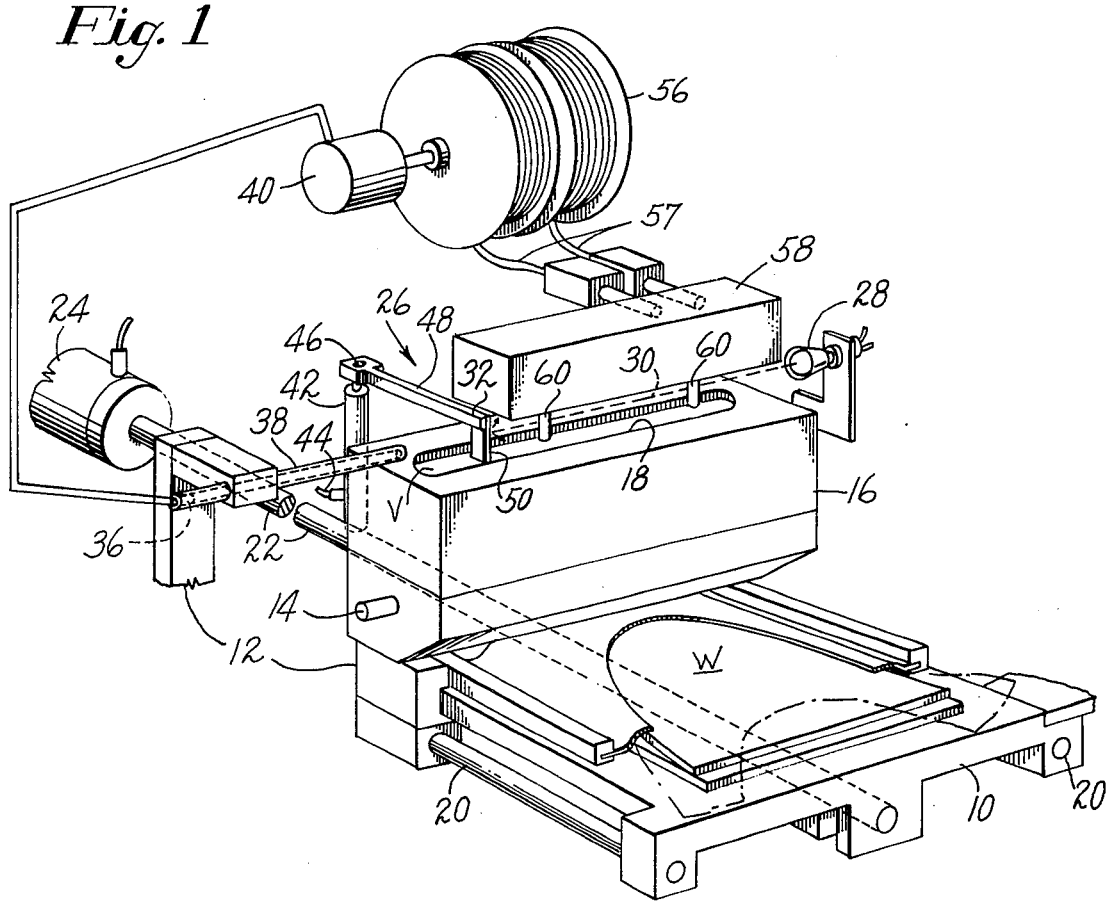
FIG. 1 is a perspective and somewhat schematic view of a portion of a machine for melting and dispensing thermoplastic material and, except as disclosed herein, may be assumed to correspond generally to the type of shoe component coating machine disclosed in the above mentioned U.S. Pat. No. 3,277,867, a cement applicator reservoir being in an inoperative position and a liquid level probe or plunger being in down position.
Figure 2:
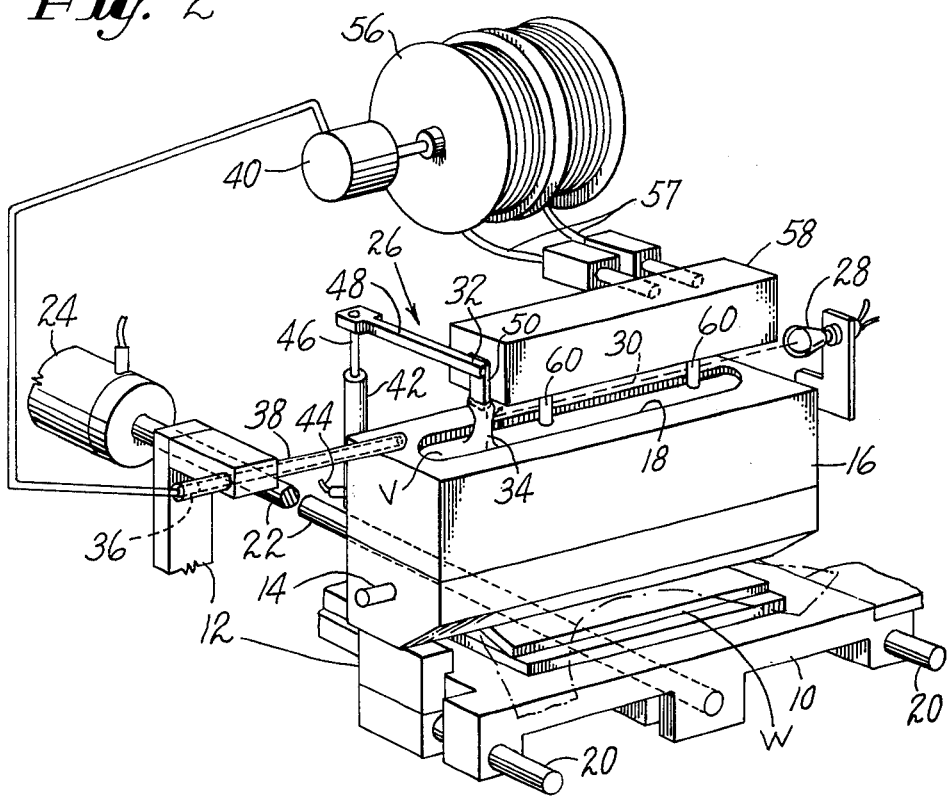
FIG. 2 is a view similar to FIG. 1 but with the parts shown at a later stage in a cycle wherein a workpiece has been presented for coating, and the plunger has raised a liquid beam-blocking curtain or shield.
Figure 3:
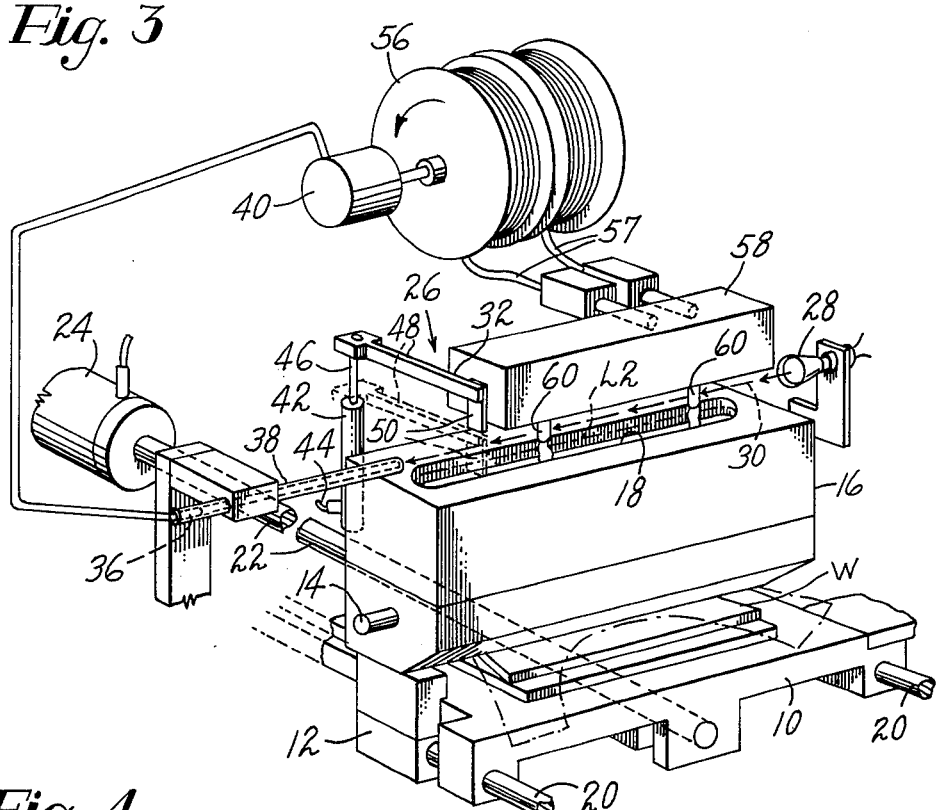
FIG. 3 is a view similar to FIG. 2 except that the raised plunger, due to inadequate cement in the reservoir, now fails to provide a beam-blocking adhesive curtain, thereby signaling for adhesive replenishment.

In the illustrative coating machine of FIGS. 1–3 and as disclosed in the patent mentioned above, a carriage 10 is mounted for horizontal reciprocating movement on a machine frame generally designated 12. The carriage 10 accordingly supports a workpiece W placed thereon to be moved from an inoperative position shown in FIG. 1 into operative relation beneath an applicator roll not herein shown but, for example, integrally formed with a shaft 14 (FIGS. 1–3) having bearings in an applicator housing block 16. This block is formed with a chamber 18 having its lower portion in communication with the applicator roll and constituting a reservoir for a viscous liquid V, in this case molten thermoplastic material such as a hot melt cement, the level of which is to be maintained by means herein to be described.

For shifting successive workpieces W into and out of position for receiving a coating of the liquid V, the carriage 10 has its corner blocks slidable on parallel guide rods 20,20, and a piston rod 22 secured to a central portion of the carriage extends rearwardly to a dual acting piston-cylinder device 24. It will be understood that the work could be shifted manually in some situations to and from its adhesive receiving position, the arrangement in the illustrative embodiment desirably employing power means including a treadle (not shown) which is also adapted, when pressurizing one end of the device 24, to actuate liquid level controlling mechanism generally designated 26 next to be explained.

Figure 4:
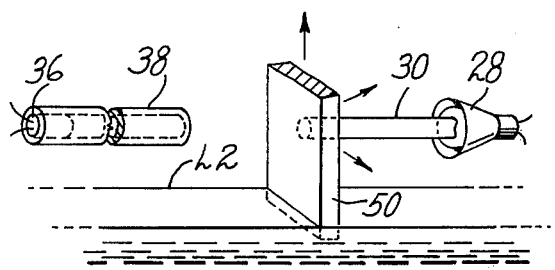
FIGS. 4–6 inclusive are enlarged and somewhat schematic perspective detail views, respectively, of the level sensing mechanisms shown in FIGS. 1–3.
Figure 5:
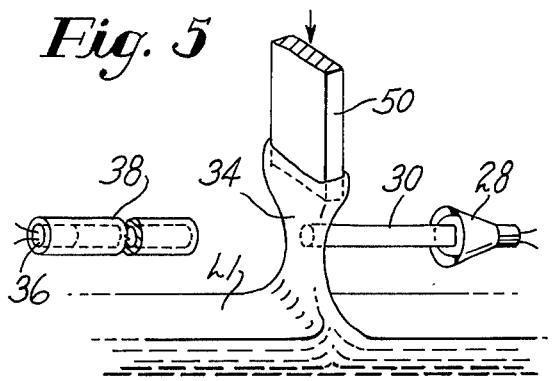
Figure 6:
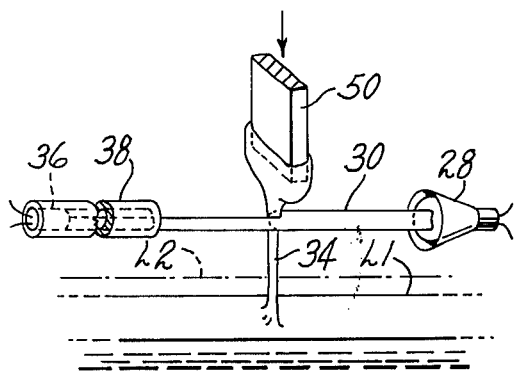
Figure 7:
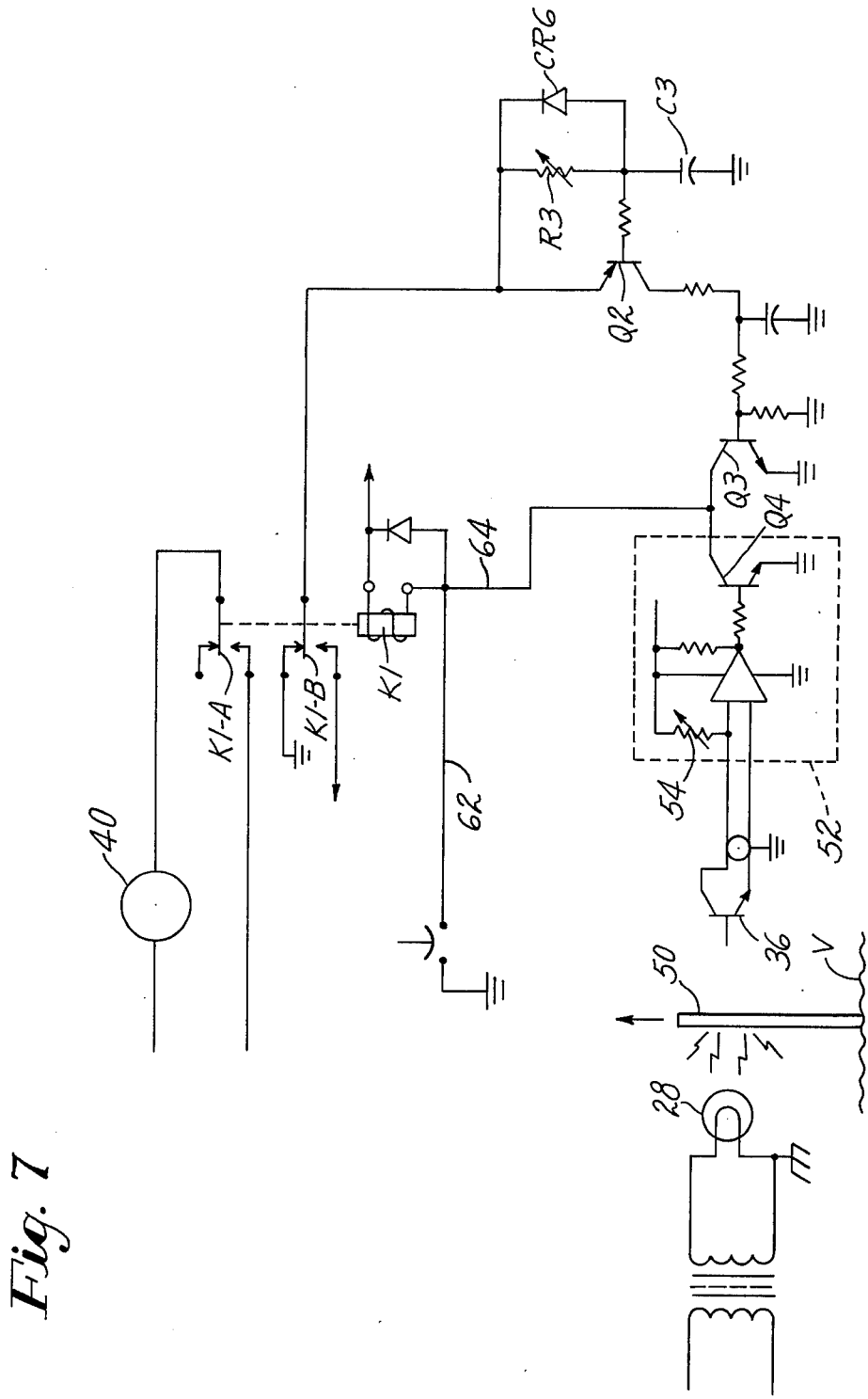
FIG. 7 is a schematic diagram of electric circuitry for controlling the level of the adhesive.

The mechanism 26 comprises a source of light 28 mounted on or near one side of the block 16 for directing a beam 30 substantially adjacent and parallel to the upper surface of the liquid V in the chamber 18 when the level of the liquid is within an acceptable or desired range. The lower limit level may be designated L1 (FIGS. 4, 6) and the upper desirable level may be designated L2 (FIG. 3). The light beam 30, unless interrupted by level control means in the form of a vertically reciprocable probe or plunger 32 or by a curtain 34 of the viscous liquid raised from the surface level by the elevated plunger 32, is in the narrowed "field of vision" of a sensor herein shown in the form of a phototransistor 36 (FIG. 1–3 and 7), fixedly mounted on or near an opposite side of the open chamber 18. The phototransistor 36 is mounted in a protective beam-receiving tube 38, preferably in its end relatively remote from the reservoir 18, and is operatively connected through a control circuit as shown in FIG. 7 to a material feeding mechanism herein shown schematically in the form of a motor 40 (FIGS. 1–3 and 7). The tube 38 is desirably on the order of about 1/16 inch in internal diameter, and by means of its length suitably restricts the "field of view" of the sensor 32 to detect the beam 30 when and if it is allowed to pass by the plunger 32 or the missing or inadequate curtain 34. The tube 38 may be supported by a portion of the frame 12.

While it is within the scope of this invention to provide a manually operable plunger 32 in the chamber 18 and thus provide, at least potentially, a beam-blocking liquid curtain 34, it is believed preferable to provide means for automatically moving the plunger heightwise periodically, and desirably at a cyclical rate proportional to the rate of usage of the liquid V. To this end as herein shown, a piston-cylinder device 42 for actuating the plunger 32 is provided. The device 42 has fluid pressure connection via a tube 44 with the piston-cylinder device 24 such that shifting the workpiece W to or from coating position also causes a reciprocable piston rod 46 of the device 42 to vertically move the plunger 32. The latter desirably is generally L-shaped, a reduced horizontal stem portion 48 being secured at one end to the rod 46, and a depending "flag" or probe portion 50 being arranged to operate between an upper position above the beam 30 and a lower position wherein the plunger portion 50 is immersed in, or at least contacts the surface of, the liquid V, assuming the latter is within an acceptable range in the chamber 18.

It will be understood that the plunger 32 and its operating mechanism may be of widely different construction as appropriate to particular applications of the invention. It has been found that in the illustrative application, wherein temperature of the liquid adhesive approaches 400°F. and viscosity of the liquid V is usually not low, the plunger portion 50 is advantageously nonmetallic to reduce heat flow and hence avoid excessive build-up of congealed liquid thereon which could interfere with consistently attaining a sensitive "reading" of the liquid level. The portion 50 must itself, of course, be wide enough to block the beam 30, and should normally be light weight and heat resistant. A plunger portion 50 of fiber glass has been found very satisfactory in controlling the liquid level of hot melt thermoplastics. It will be understood that a strictly vertical movement of the plunger may not be necessary, and accordingly for example an alternative pivotal mounting and actuation of the plunger 50 may, in some applications, be employed and attain sufficiently accurate relation to the beam and the liquid curtain.

As has been indicated, in each cycle of the machine (or at least periodically) the level of the liquid in the adhesive reservoir 18 is monitored by the control circuit shown in FIG. 7 and next to be described. When the level for any reason becomes lower than the limit L1, the rising plunger portion 50 will not have contacted the liquid V or will have been unable to make adequate contact therewith, and hence (as indicated in FIGS. 3, 6) will be unable to lift a curtain 34 sufficient to block the light beam 30 when the plunger ascends above it. As a consequence, the phototransistor 36 is struck by the beam, and a resultant electrical pulse is sent to an amplifier 52 (FIG. 7) including a sensitivity adjuster 54 and a transistor Q4. This causes a solenoid relay K1 to be energized which then actuates the feed motor 40, thereby rotating a supply roll 56 carrying in this case, two lengths of rod cement 57,57. The rod cement is thus advanced to a suitable heating and melting unit 58 from whence replenishing liquid adhesive is delivered to the chamber 18 via ports 60,60. The control circuit includes a constant low voltage DC power supply line 62 connected to the motor "turn-on" line 64 and to a time latch or time delay circuit for a purpose next to be indicated.

The control circuit comprises a time delay mechanism for insuring that, for an interval following the control circuit triggering by the phototransistor 36 the feed mechanism 40,56 is not immediately deactivated when the beam 30 is prevented by the plunger 32 from impinging on the phototransistor 46. The latter, being then deenergized, turns off the transistor Q4. But when the solenoid relay K1 had been energized to start the motor 40 as above noted, a time latch portion of the circuit was also energized, power being supplied to transistors Q2 and Q3 (FIG. 7). The transistor Q3 is in parallel with the transistor Q4. Accordingly when transistor Q3 is energized, it allows the transistor Q4 to remain deenergized without deenergizing the solenoid relay K1 and thereby deenergizing the motor 40. Consequently this time delay circuitry enables the motor to continue to feed rod adhesive 57 for an adjustable preset period of time which is a function of the charge time of a variable resistor R3 and a capacitor C3. When the latter charges to a high level, a transistor Q2 is thereby turned off which deenergizes the transistor Q4 thus deenergizing the relay K1 and stopping the motor 40 and material infeed. The capacitor C3 is then discharged through a diode CR6, and the normally closed switch contacts of K1–B setting the stage for the next cycle. If the reservoir liquid level at the end of the preset time is still too low, the latching circuit is again automatically caused to actuate the motor 40 a set time interval insuring adequate liquid level.

It will be apparent that the level control mechanism is of a fail-safe type; that is to say, the level control mechanism automatically effects liquid replenishment as needed above a minimum level, and also, in the event a desired maximum level should be exceeded, the plunger 32 and/or its liquid curtain 34 will assuredly block the beam 30 and hence stop adhesive inflow by preventing operation of the motor 40 and thereby avoid overflow of the chamber 18.

The described level controlling mechanism has provided reliable, accurate, and easily maintained in continuous operating condition. It performs well without being critical as to changes in temperature or viscosity, and is not unduly affected by any tendency of the liquid to congeal and build-up on the plunger 32. It will be appreciated that this reliable control system effectively utilizes the viscosity of the liquid V, when sufficiently available to be raised as a curtain resisting drainage from the raised plunger 32, to defer liquid replenishment action. Likewise, or conversely, the system promptly detects the inadequacy of the supply level L1 when no adequate curtain can be raised by the plunger 32 to block the beam 30, and at once initiates corrective liquid replenishment.

Having thus described my invention, what I claim as new and desire to secure by Letters Patent of the United States is:

1. Mechanism for controlling the level of a viscous liquid in a container comprising means associated therewith for replenishing the liquid therein, means for directing a beam of light adjacent to the surface of the liquid, a sensor responsive to said beam for controlling operation of said liquid replenishing means and a plunger movable heightwise in the container and across the beam between a position wherein a portion of said surface is potentially contacted by at least the lower end of the plunger and an upper position wherein said lower end is above said beam, the arrangement being such that upward movement of the plunger following its contact with the liquid in the container when the liquid surface level therein is adequate raises a liquid curtain blocking the beam, and when said level is inadequate the upward movement of the plunger is ineffective to produce a beam-blocking curtain whereupon the sensor signals for operation of said replenishing means.

2. Mechanism as in claim 1 wherein means is provided for reciprocating the plunger intermittently and vertically between predetermined limits to monitor and establish an acceptable range of liquid level in said container.

3. Mechanism as in claim 1 wherein the plunger is non-metallic

4. Mechanism as in claim 3 wherein the plunger is, at least in part, of fiber glass.

5. Mechanism as in claim 1 further characterized in that power means is provided for operating said plunger in potential curtain lifting strokes with a frequency roughly proportionate to the rate at which said liquid is dispensable from said container.

6. In a machine for applying a coating of viscous liquid, a reservoir therefor having an inlet and an outlet, means for feeding material into said reservoir inlet to replenish the liquid passing through said outlet, and automatic mechanism adjacent to the reservoir for maintaining the level of the liquid in a predetermined range in the reservoir, said mechanism comprising a control circuit including a light responsive sensor for regulating said material feeding means, a source of light for directing a beam to the sensor and parallel and adjacent to the surface of the liquid in the reservoir when said surface is within said predetermined range, and a plunger operable in the reservoir and having a beam-blocking portion movable heightwise through said range from a position above the beam, said plunger portion being arranged upon retraction from immersion in the liquid when within said range to raise a curtain of the liquid for effectively blocking said beam.

7. A machine as in claim 6 wherein said circuit includes an adjustable time delay mechanism for maintaining operation of said material feeding means for a selected time interval.

8. A machine as in claim 6 wherein the plunger is mounted at one side of the reservoir for movement vertically between predetermined limits, and the plunger is generally L-shaped, a horizontal portion of the plunger supporting a depending probe portion, and the latter being of a non-metallic material affording low heat conductivity.

9. A machine as in claim 8 wherein the plunger is operatively connected to a piston-cylinder device, and mechanism controlling the rate of usage of the liquid is arranged to actuate said device.

* * * * *